Figure 1:
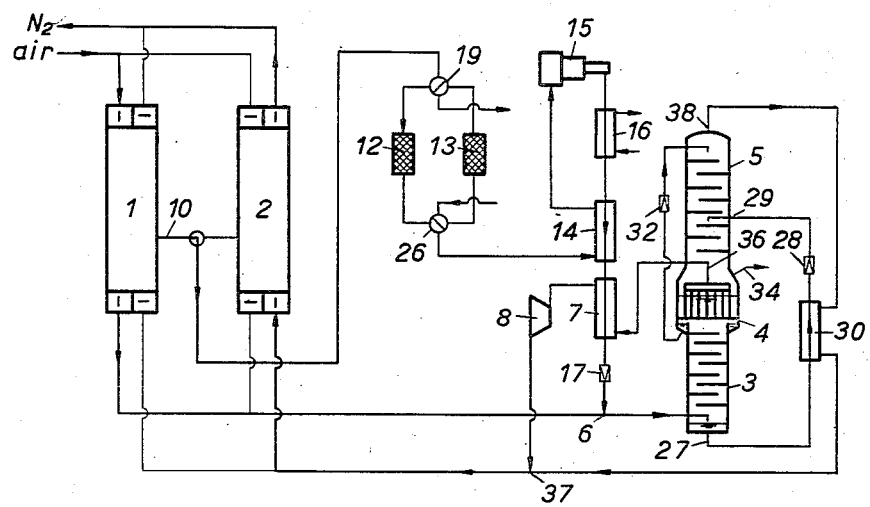

March 25, 1958  R. LINDE  2,827,775
PROCESS FOR SEPARATING A COMPRESSED GAS MIXTURE
Filed May 10, 1955

United States Patent Office 2,827,775
Patented Mar. 25, 1958

2,827,775

PROCESS FOR SEPARATING A COMPRESSED GAS MIXTURE

Richard Linde, Munich-Solln, Germany, assignor to Gesellschaft für Linde's Eismaschinen Aktiengesellschaft, Münich, Germany Application May 20, 1955, Serial No. 509,720
In Germany March 9, 1950

Public Law 619, August 23, 1954
Patent expires March 9, 1970

6 Claims. (Cl. 62—175.5)

This invention relates to the separation of gas mixtures by compression and cooling, the separation of the mixtures being preceded by purification. In cold accumulators which are adapted to be changed over, or counter-current apparatus of interchangeable cross-section, the steps of cooling and purification are simultaneously carried out. The re-vaporisation of the separated condensates at the cold end of the heat exchanger is impeded if equal quantities of hot, unseparated gas mixtures and cold separation products are fed to the exchanger. The reason for this is that the compressed gas mixtures, especially at low temperatures, have a substantially greater specific heat than the uncompressed products of separation. Consequently, the temperature difference between the products of equal weight entering and leaving the exchanger is substantially greater at the cold end than at the other parts of the exchanger. Thus the re-vaporisation of separated condensates is impeded even if the ratio between the volumes of the gases entering and leaving, which is required for revaporisation at medium or high temperature, is maintained. In the art of gas separation, this is remedied in various ways, for example by not introducing part of the gas mixture to be separated through the cold accumulators, and by discharging the products of separation through the accumulators. One example of the latter method is provided by the high-pressure air separation by the Linde-Frankl process. The air is not introduced through the cold accumulators, but one part of its products of separation passes out through the regenerators. Another known method resides in feeding the whole of the gas mixture to be separated to the heat-exchangers, branching off an incompletely purified, cooled part before it reaches the coldest zone and completely cooling and purifying this part in counter-current heat exchange with the cold gas mixture. The refrigerated impurities are deposited in the counter-current apparatus and the apparatus is freed from the deposits by heating. Meanwhile, a second counter-current apparatus cools and purifies the branched-off gas current. These counter-current apparatuses are large and costly and frequent changing thereof is necessary. Furthermore, the temperature of the gas current cooled therein fluctuates like that of the component current, to the detriment of its further use of these apparatus.

It is an object of the present invention to provide a new and improved way of solving the problem referred to above.

According to this invention there is provided a process for the separation of a compressed gas mixture, comprising the steps of partially cooling said mixture in heat-exchange with the separation products thereof, withdrawing part of said partially cooled mixture, further cooling the remainder of said mixture in said heat-exchange, contacting said part with an adsorption material to purify the same of the gaseous impurities, heating said part to approximately ambient temperature, compressing said part at least to a medium pressure, recooling the same substantially to its temperature after the partial cooling, further cooling said part to liquefy the same, expanding the liquefied gases, and feeding the liquefied gases together with the fully cooled remainder of said gas mixture to a separator for said mixture. The exceptionally high purifying action of the adsorption medium at the low temperature at which the adsorption medium can be employed in a relatively small quantity, renders unnecessary a special purification of the gas, for example by chemical means at normal temperature. In the case of the invention the gas is already practically completely free from water when it enters the adsorber.

The gas thus purified and additionally compressed liquefies more or less, depending upon pressure and composition, in cold exchange with the gas to be expanded whilst performing work and can thereafter be separated. For example, air to be separated is substantially liquefied, expanded to the pressure of the first separation stage and introduced into this stage. The cold output of the expansion turbine is increased in known manner by the partial heating of the gas to be expanded. In the case of the separation of air with so-called double rectification, it is possible to control the oxygen yield of the separating arrangement. Thus, if that, for example, the proportion of air to be expanded and introduced into the upper column in gaseous form is reduced owing to the larger cold output, the oxygen yield increases. Furthermore the cold output of the entire arrangement is somewhat further increased owing to the fact that the additionally compressed and cooled air generates additional cold due to throttling down to the pressure of the lower column of the separator. The quantity and the pressure of the additionally compressed air depends upon the requirements at the momentary operating stage of the whole apparatus. During normal operation, the cold output is adapted by suitable choice of the pressure of the heating gas to the requirements of operation.

The gas extracted after flowing through a section of the regenerator and purified by adsorption can be employed, for example in the separation of air, in its entirety, to heat compressed nitrogen which is taken from the pressure column of the separating apparatus and expanded in a turbine whilst performing work.

Figure 2:
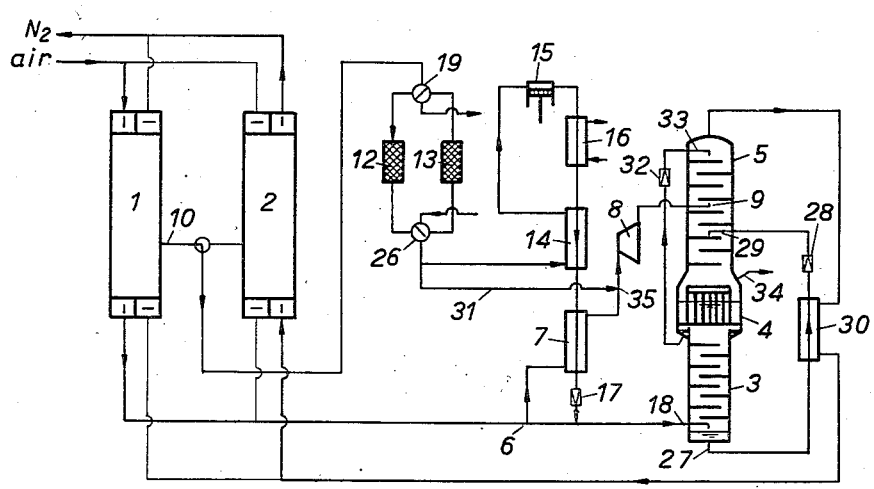

For a better understanding of the invention and to show how the same may be carried into effect, reference will now be made to the accompanying drawings, in which:

Figure 1 shows diagrammatically an air-separation installation and Figure 2 shows diagrammatically another constructional form of an air separation installation similar to that of Figure 1. Referring firstly to Figure 1, compressed air is cooled to low temperatures in regenerators 1, 2 and introduced beyond a point 6 into the pressure column 3 of a separating apparatus 4. After flowing through a section of a regenerator, part of the air is extracted at 10, purified by an adsorber, for example 12, filled for example with gel (another adsorber 13 is in the discharging stage), heated in exchange with itself, that is in reflux with warmer compressed air, compressed in a compressor 15, and, after dissipation of its heat of compression in a cooler 16, cooled in an exchanger 14 substantially to the temperature at which it was extracted from the regenerator and liquefied in a counter-current heat exchanger 7 in indirect exchange with cold nitrogen taken from the head of the pressure column 3 at 36. The air is then expanded through a valve 17, combined at 6 with the main air stream and introduced into the pressure column 3. The nitrogen which is re-heated to a certain extent in the counter-current heat exchanger 7 is expanded in an expansion turbine 8 whilst performing work, combined at 37 with the nitrogen coming from the upper column and led out again through the regenerator 2. The oxygen is taken at 34 from the upper column 5 of the separating apparatus 4 and heated in the usual manner with utilisation of its cold content in regenerators which are not shown. The upper column is charged with liquid rich in oxygen through a duct 27, a valve 28 and a duct 29, whilst the cooling of the liquid to low temperatures is effected by nitrogen escaping at 38 in a counter-current apparatus 30. The liquefied compressed nitrogen from the pressure column 3 is expanded through the valve 32 into the upper column 5.

If the cold is not produced by expansion of compressed nitrogen, but by expansion of air leaving the regenerator, then, in accordance with another form of the invention, all the ar branched from the regenerator is not further compressed and employed to heat the air to be expanded in indirect cold exchange, but only a part thereof is heated to normal temperature in exchange with returning compressed air, compressed to medium or higher pressure, and, after dissipation of the heat of compression cooled to the neighbourhood of the temperature at which it is extracted from the regenerator, and brought into heat exchange with the colder air to be expanded whilst performing work, so as to be thus entirely or partially liquefied. The latter part is thereafter preferably expanded to the pressure of the first column of the two-stage air separating arrangement and introduced into this arrangement. The air which has been heated to a certain extent before being expanded yields a greater amount of cold in the expansion than if the expansion had taken place at a lower temperature.

The manner in which this process is carried out will be illustrated by Figure 2. Air is passed under a pressure of a few atmospheres through the regenerator 1 and thereafter enters the pressure column 3 of the separating apparatus 4. Part of this air is branched off at 6 and heated again to a somewhat higher temperature in the counter-current apparatus 7 by air which is more highly compressed but pre-cooled to a lesser extent, expanded by the expansion engine 8 to the pressure of the upper column whilst performing work and introduced at 9 into the upper column 5. The part serving to heat this air has been taken at 10 at a higher temperature than that obtaining at the cold end of the regenerator, completely freed from carbon dioxide and other impurities by one of two gel containers which are adapted to be changed over (for example 12), heated in the counter-current apparatus 14, compressed by the compressor 15 to a pressure of about 20 to 40 atm., and re-cooled in the counter-current apparatus 14 approximately to the temperature at which it is extracted from the regenerator after dissipation of its heat of compression in the cooler 16. It is then cooled in heat-exchange with cold low-pressure air from the regenerator to the temperature thereof and thus liquefied, expanded in the valve 17 to the pressure of the pre-separation column and introduced into this column at 18. The gel containers 12 and 13 are provided with valves 19 and 26 by means of which it is possible to regenerate one gel container whilst the other is in operation. Part of the air purified by adsorption is added at 35 through the duct 31 to the air to be expanded without intermediate compression.

The manner of operation of the arrangement is in other respects the same as usual, that is to say, the liquid rich in oxygen produced in the pressure column is taken from the sump of this column at 27 and, after cooling to low temperatures in exchange with the product of separation (nitrogen) from the upper column in the counter-current apparatus 30, expanded at 28 and introduced at 29 into the upper column. The liquid nitrogen collected in the condenser of the pressure column is expanded at 32 and charged in liquid form at 33 to the head of the upper column. The escaping nitrogen returns through the counter-current apparatus 30 and, in the operating stage illustrated, through the regenerator 2 and, after heating, into the atmosphere. The second product of separation (oxygen) is withdrawn for example at 34 and heated in regenerators or counter-current heat exchangers (not shown) in heat-exchange with another part of the air, and discharged.

The regenerators described above may be replaced by other purifying arrangements such as counter-current heat-exchangers, in which separated impurities are sublimated again by cold gas. On the other hand, the purification of the branch stream by adsorption medium at the temperature of withdrawal should be simpler and more economical than, for example, washing at low temperature or chemical removal of the impurities at normal temperature. Purification of this branch stream by condensation of the impurities in additional counter-current apparatus or regenerators which are adapted to be changed over, at lower temperatures, also affords no advantage over the invention described above.

I claim:

1. A process for the separation of a compressed gas mixture, comprising the steps of partially cooling said mixture in heat-exchange with the separation products thereof, withdrawing part of said partially cooled mixture, further cooling the remainder of said mixture in said heat-exchange, contacting said part with an adsorption material to purify the same of gaseous impurities, heating said part to approximately ambient temperature, compressing said part at least to a medium pressure, re-cooling the same substantially to its temperature after the partial cooling, further cooling said part to liquefy the same, expanding the liquefied gases, and feeding the liquefied gases together with the fully cooled remainder of said gas mixture to a separator for said mixture.

2. A process according to claim 1, wherein said liquefied gases are combined with said remainder before being introduced into said separator.

3. A process according to claim 1, wherein the further cooling of said part is effected by means of separation products from said separator, and comprising the further step of expanding the resulting partially heated separation products.

4. A process according to claim 1, wherein said mixture is air, the products of separation essentially consist of oxygen and nitrogen, and the adsorption material essentially consists of a gel adapted to remove carbon dioxide from the air mixture.

5. A process according to claim 1, and further comprising the steps of withdrawing a portion of said part before the re-heating of said part expanding said portion, dividing the fully cooled remainder of said gas mixture, into two fractions, partially re-heating one fraction in heat-exchange with said part, for said further cooling of the latter combining said fraction with a portion of said part withdrawn after the purification of the latter, feeding the combined gases to the low-pressure stage of a two-stage separator, and feeding the unexpanded air of the other fraction together with the partially liquefied remainder of said part to the high-pressure stage of said two-stage separator.

6. A process according to claim 5, wherein the gas mixture to be separated is air, the separation products essentially consist of nitrogen and oxygen, the gaseous impurities essentially consist of carbon dioxide, and the adsorption material essentially consists of a gel capable of abstracting the carbon dioxide from the air contacted with said adsorption material.

References Cited in the file of this patent

UNITED STATES PATENTS 2,650,481     Cooper _____ Sept. 1, 1953

FOREIGN PATENTS 373,918     Great Britain _____ June 2, 1932
497,662     Belgium _____ Feb. 19, 1951
(Corresponding United States Patent—Karwat et al., 2,699,047, January 11, 1955, filed October 27, 1950)